United States Patent
Timmons et al.

(10) Patent No.: US 8,219,125 B2
(45) Date of Patent: Jul. 10, 2012

(54) SYSTEM AND METHOD FOR ENHANCED MESSAGE ADDRESSING

(75) Inventors: Michael Timmons, San Jose, CA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 531 days.

(21) Appl. No.: 12/254,229

(22) Filed: Oct. 20, 2008

(65) Prior Publication Data

US 2009/0104923 A1 Apr. 23, 2009

Related U.S. Application Data

(60) Provisional application No. 60/980,809, filed on Oct. 18, 2007.

(51) Int. Cl.
*H04W 4/00* (2009.01)
(52) U.S. Cl. .............. 455/466; 455/414.1; 455/566; 709/206
(58) Field of Classification Search .......... 455/566, 455/466, 414.1; 709/206, 207, 209
See application file for complete search history.

(56) References Cited

U.S. PATENT DOCUMENTS

| 7,558,578 B1 * | 7/2009 | De Beer ............ 455/445 |
| 2006/0168038 A1 * | 7/2006 | Lin ............... 709/206 |

OTHER PUBLICATIONS

"Create SMS Address Book Groups", Jun. 2, 2005, "http://www.ipipi.com/help/addressbookgroups.htm", p. 1-2.*

* cited by examiner

*Primary Examiner* — Kamran Afshar
*Assistant Examiner* — Dung Lam
(74) *Attorney, Agent, or Firm* — Edell, Shapiro & Finnan, LLC (57) ABSTRACT

Coincident with the evolution, maturation, etc. of wireless messaging ecosystems, today and in the future the addressing of a message needs to include—and all of the different entities that process messages (e.g., Wireless Carriers, intermediaries, enterprises, Content Providers, Service Providers, etc.) need to support—additional (i.e., enhanced, flexible, extensible, etc.) message addressing capabilities. The present invention provides an infrastructure that supports such additional (i.e., enhanced, flexible, extensible, etc.) message addressing capabilities through, among other things, the availability of Dynamic Tags (DynaTags). The infrastructure may optionally leverage the capabilities of a centrally-located Messaging Inter-Carrier Vendor.

26 Claims, 6 Drawing Sheets

SYSTEM AND METHOD FOR ENHANCED MESSAGE ADDRESSING

This application claims the benefit of U.S. Provisional Patent Application No. 60/980,809, filed on Oct. 18, 2007, which is herein incorporated by reference in its entirety.

BACKGROUND

1. Field of the Invention

The present invention relates generally to telecommunications services. More particularly, the present invention relates to capabilities that enhance substantially the value and usefulness of various messaging paradigms including, inter alia, Short Message Service (SMS), Multimedia Message Service (MMS), Internet Protocol (IP) Multimedia Subsystem (IMS), etc.

2. Background of the Invention

As the 'wireless revolution' continues to march forward the importance to a Mobile Subscriber (MS)—for example a user of a Wireless Device (WD) such as a mobile telephone, a BlackBerry, etc. that is serviced by a Wireless Carrier (WC)—of their WD grows substantially.

One consequence of the growing importance of WDs is the resulting ubiquitous nature of WDs—i.e., MSs carry them at almost all times and use them for an ever-increasing range of activities. For example, MSs employ their WDs to, possibly inter alia:

1) Exchange messages with another MS (e.g., "Let's meet for dinner at 6") through Peer-to-Peer, or P2P, messaging.

2) Secure information (such as, for example, weather updates, travel alerts, news updates, sports scores, etc.), participate in voting initiatives (such as, for example, with the television show American Idol®), etc. through various of the available Application-to-Peer, or A2P, based service offerings.

3) Engage in Mobile Commerce (which, broadly speaking, encompasses the buying and selling of merchant-supplied products, goods, and services through WDs).

The WD uses that were described above have, among other things, driven a steady annual increase, year over year, in the number of (SMS, MMS, etc.) messages that have been exchanged by and between WDs. That steady increase shows no sign of abating. For example, as reported by the industry group CTIA (see ctia.org on the World Wide Web [WWW]) in the U.S. there were over 158 billion SMS messages sent during 2006 (representing a 95% increase over 2005) and there were over 2.7 billion MMS messages sent during 2006 (representing a 100% increase over 2005).

As the messaging ecosystem has matured, and among other things messaging has been used for different purposes (e.g., P2P, A2P, etc.) and the volume of messaging has increased, different message addressing schemes or paradigms have arisen. For example, in the past the addressing of a message may have been fairly straightforward and may have included just a conventional Telephone Number (TN). More recently the addressing of a message may have included a Short Code (SC). For reasons of improved MS user experience, increased performance, etc. today and in the future the addressing of a message needs to include, and all of the different entities that process messages (e.g., WCs, intermediaries, enterprises, Content Providers (CPs), Service Providers (SPs), etc.) need to support, further (i.e., enhanced, flexible, extensible, etc.) message addressing capabilities.

The present invention provides an infrastructure that supports such further (i.e., enhanced, flexible, extensible, etc.) message addressing capabilities through among other things the availability of Dynamic Tags (DynaTags, which as described in detail below [1] are variable length sequences of various numeric, alphabetic, special, etc. characters that reside within a private namespace [i.e., a namespace that is private to a MS] that is offered by, and hosted or resident within, for example a SP [2] that may be managed [e.g., created, edited, deleted, organized, etc.] by a MS within their own private namespace and [3] that may be associated by a MS to one or more destination addresses [such as for example a TN, a SC, an E-Mail address, an Instant Messaging [IM] handle or address, a Session Initiation Protocol [SIP] address, etc.] and [4] that may be employed by a MS as the address of a [SMS, MMS, etc.] message) and addresses various of the not insubstantial challenges that are associated with same.

SUMMARY OF THE INVENTION

In one embodiment of the present invention there is provided a method for the routing of a message within a wireless messaging ecosystem, including (1) receiving at a gateway an incoming message, the incoming message containing at least a DynaTag and having been originally initiated as a wireless message, from an originating mobile subscriber, including the DynaTag, and (2) performing one or more processing steps including querying a namespace that is private to the originating mobile subscriber to resolve the DynaTag to one or more destination addresses (where the destination addresses were previously associated to the DynaTag by the originating mobile subscriber).

In the embodiment the incoming message is one of an SMS message, a MMS message, or an IM message.

Still in accordance with the embodiment, the namespace that is private to the originating mobile subscriber may be structured in different fashions (e.g., hierarchically) and may be managed by the originating mobile subscriber (e.g., through some combination of a Web-based facility and/or a message-based facility).

Still in accordance with the embodiment, the method may employ information previously supplied by said mobile subscriber.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the description that may be found below, further serve to illustrate among other things the principles, structure, and operation of such embodiments. Variations of these embodiments will be apparent to persons of ordinary skill in the relevant art based on the teachings contained herein.

It should be understood that these figures depict embodiments of the invention. Variations of these embodiments will be apparent to persons skilled in the relevant art(s) based on the teachings contained herein.

DETAILED DESCRIPTION

Aspects of the present invention may be offered as a value-add service by a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a description of a MICV, a summary of various of the services/functions/etc. that are performed by a MICV, and a discussion of the numerous advantages that arise from same. The disclosure of U.S. Pat. No. 7,154,901, and any associated continuations, is incorporated herein by reference.

Figure 1:
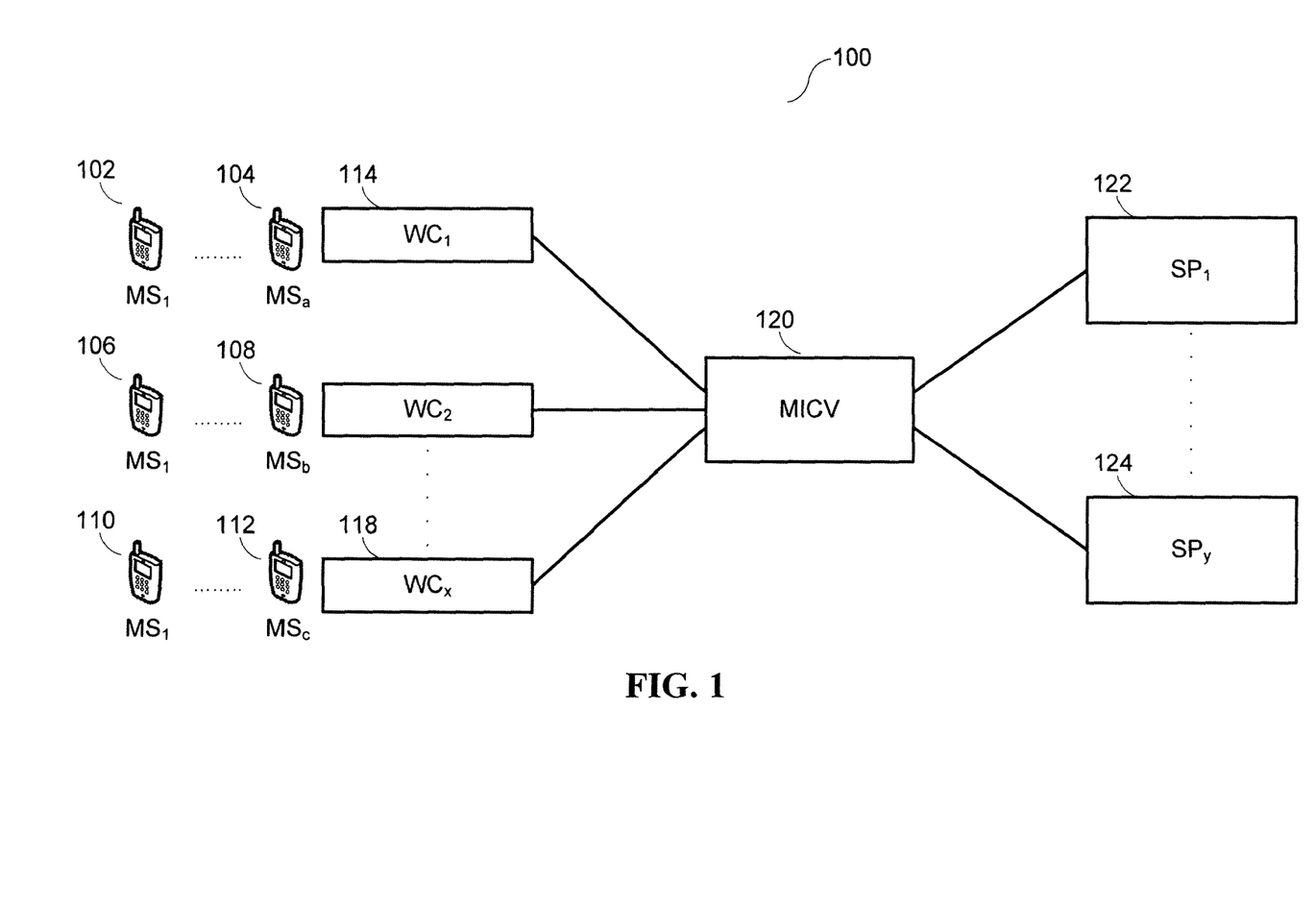
FIG. 1 is a diagrammatic presentation of an exemplary Messaging Inter-Carrier Vendor (MICV).

As illustrated by FIG. 1 and reference numeral 100 a MICV 120 is disposed between, possibly inter alia, multiple WCs ($WC_1$ 114→$WC_x$ 118) on one side and multiple SPs ($SP_1$ 122→$SP_y$ 124) on the other side and thus 'bridges' all of the connected entities. A MICV 120 thus, as one simple example, may offer various routing, formatting, delivery, value-add, etc. capabilities that provide, possibly inter alia:

1) A WC, $WC_1$ 114→$WC_x$ 118 (and by extension all of the MSs [$MS_1$ 102→$MS_a$ 104, $MS_1$ 106→$MS_b$ 108, $MS_1$ 110→$MS_c$ 112] that are serviced by a WC [$WC_1$ 114→$WC_x$ 118]), with ubiquitous access to a broad universe of SPs ($SP_1$ 122→$SP_y$ 124), and 2) A SP ($SP_1$ 122→$SP_y$ 124) with ubiquitous access to a broad universe of WCs ($WC_1$ 114→$WC_x$ 118 and, by extension, to all of the MSs [$MS_1$ 102→$MS_a$ 104, $MS_1$ 106→$MS_b$ 108, $MS_1$ 110→$MS_c$ 112] that are serviced by a WC [$WC_1$ 114→$WC_x$ 118]).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

While the discussion below will include a MICV it will be readily apparent to one of ordinary skill in the relevant art that numerous other arrangements are equally applicable and indeed are fully within the scope of the present invention.

In the discussion below the present invention is described and illustrated as being offered by a SP. A SP may, for example, be realized as a third-party service bureau, an element of a WC or a landline carrier, an element of a MICV, multiple third-party entities working together, etc.

In the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

To better understand the particulars of the present invention consider for a moment a simple hypothetical example—SP $SP_x$ offers a service that has been enhanced or augmented as provided through aspects of the instant invention and Mary, a MS, uses $SP_x$'s service.

Figure 2:
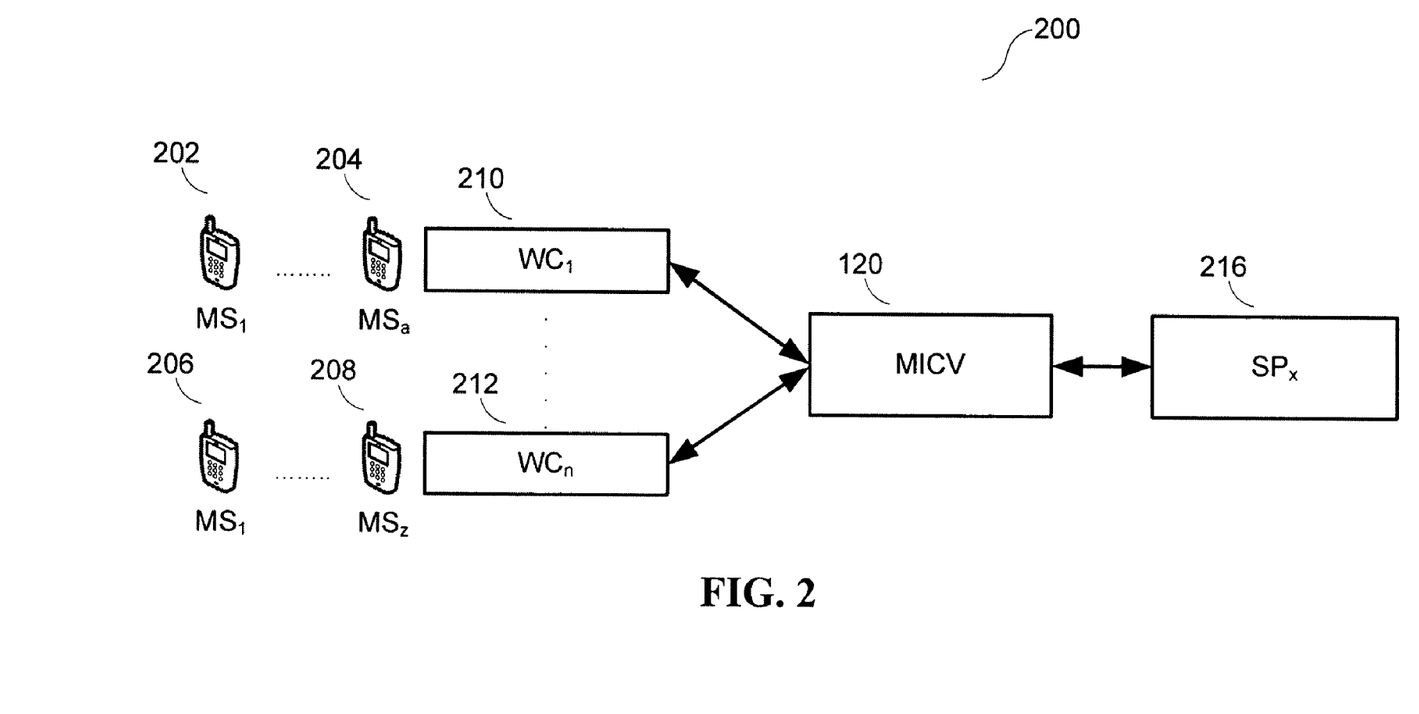
FIG. 2 illustrates one particular arrangement that is possible through aspects of the present invention.

FIG. 2 and reference numeral 200 depicts one possible arrangement under which our hypothetical example might operate. In brief, a number of MSs ($MS_1$ 202→$MS_a$ 204 and $MS_1$ 206→$MS_z$ 208, including Mary) may use their WDs to exchange messages in rich and complete ways leveraging, possibly inter alia, various of the services that are offered by $SP_x$ 216.

Figure 3:
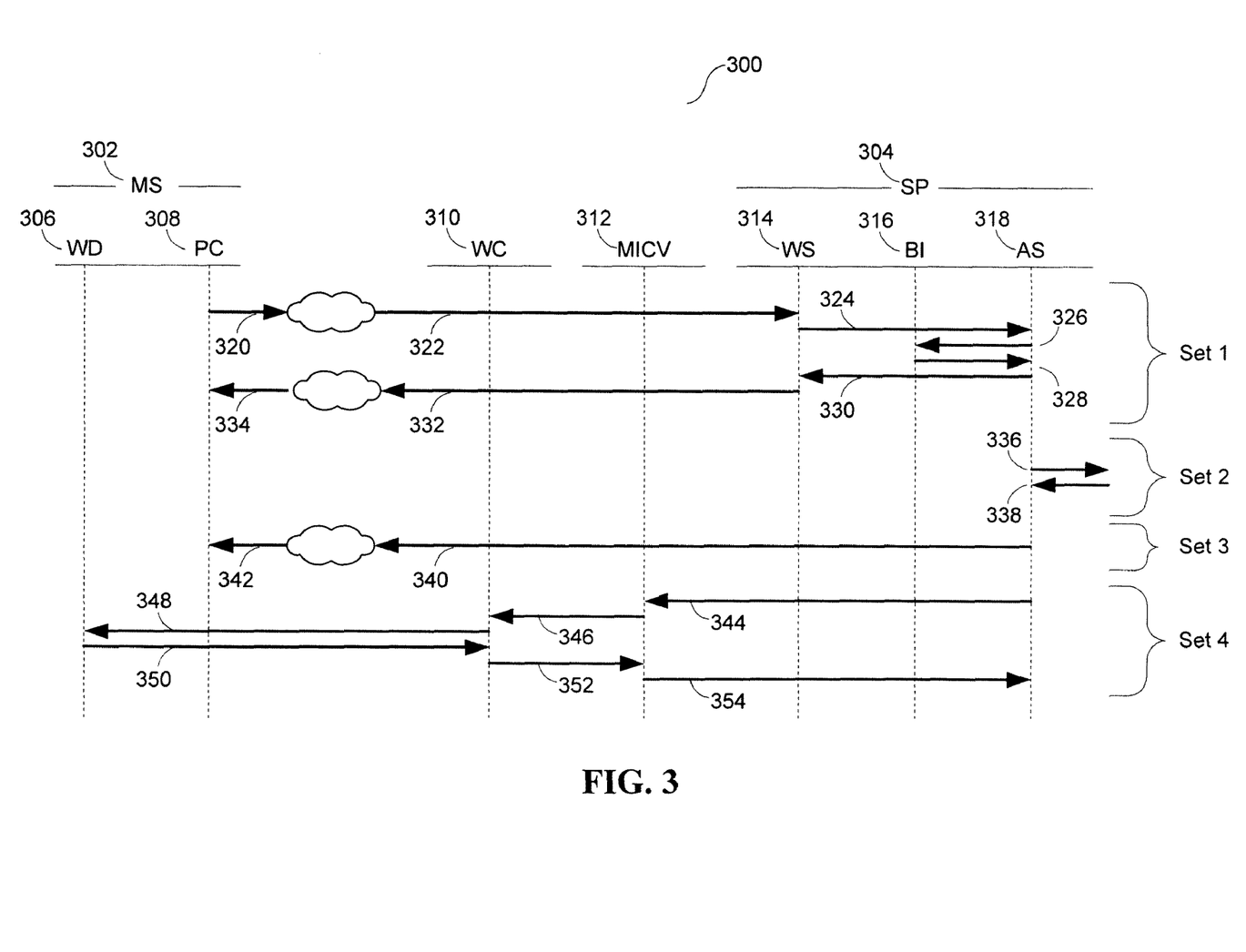
FIG. 3 illustrates various of the exchanges or interactions that are supported by aspects of the present invention.

FIG. 3 and reference numeral 300 illustrates various of the exchanges or interactions that might occur under an optional registration portion of our hypothetical example. Of interest and note in the diagram are the following entities:

MS 302 WD 306. For example, Mary's WD such as a cellular telephone, BlackBerry, PalmPilot, etc.

MS 302 Personal Computer (PC) 308. For example, one of Mary's home, work, etc. PCs.

WC 310. The provider of service for Mary's WD.

MICV 312. As noted above the use of a MICV, although not required, provides significant advantages.

SP 304 Web Server (WS) 314. A publicly-available WWW site that is optionally provided by $SP_x$.

SP 304 Billing Interface (BI) 316. A single, consolidated interface that $SP_x$ may use to easily reach, inter alia, one or more external entities such as a credit card or debit card clearinghouse, a carrier billing system, a service bureau that provides access to multiple carrier billing systems, etc.

SP 304 AS 318. Facilities that provide key elements of the instant invention (which will be described below).

It is important to note that:

1) While in FIG. 3 the MS 302 WD 306 and MS 302 PC 308 entities are illustrated as being adjacent or otherwise near each other in actual practice the entities may, for example, be physically located anywhere.

2) In the instant example the messages are shown traversing a MICV 312.

In FIG. 3 the exchanges that are collected under the designation Set 1 represent the activities that might take place as Mary 302 pursues a registration process with $SP_x$ 304. For example:

A) Mary 302 uses one of her PCs 308 to visit a WS 314 of $SP_x$ 304 to, possibly among other things, complete a service registration process (320→322).

B) The WS 314 interacts with an AS 318 of $SP_x$ 304 to, possibly among other things, commit some or all of the information that Mary 302 provided to a data repository (e.g., a database), optionally complete a billing transaction, etc. (324).

C) As appropriate and as required a BI 316 of $SP_x$ 304 completes a billing transaction (326→328).

D) After receiving a response from an AS 318 of SP$_x$ 304 (330) the WS 314 responds appropriately (e.g., with the presentation of a confirmation message, etc.) (332→334).

The specific exchanges that were described above (as residing under the designation Set 1) are illustrative only and it will be readily apparent to one of ordinary skill in the relevant art that numerous other exchanges are easily possible and indeed are fully within the scope of the present invention. As just one example, the registration process may be completed through any combination of one or more channels including, inter alia, the indicated WWW facility, wireless messaging (SMS, MMS, IMS, etc.), E-Mail messages, IM exchanges, conventional mail, telephone, Interactive Voice Response (IVR) facilities, etc.

During the registration process that was described above a range of information may be captured from a MS including, inter alia:

1) Identifying Information (e.g., general information about Mary). For example, possibly among other things, a unique identifier and a password, optionally a pseudonym or handle, name, address, age, etc.

2) DynaTags. As will be described in detail below, a DynaTag is a variable length sequence of various numeric, alphabetic, special, etc. characters that a MS may manage (e.g., create, edit, delete, organize, etc.) within their own private namespace (e.g, DynaTag book) and which a MS may employ as the destination address of a message. For each DynaTag that is identified by a MS a range of data elements may be captured (including, possibly inter alia, a destination address such as a TN, a SC, an E-Mail address, an IM handle or address, a SIP address, etc.).

3) Billing Information. Different service billing models may be offered by SPX including, possibly inter alia, free (e.g., possibly advertising-based), a fixed one-time charge, a recurring (hourly, daily, monthly, etc.) fixed charge, a recurring (hourly, daily, monthly, etc.) variable charge, a per-use charge, etc. Different payment mechanisms may be supported by SP$_x$ including, possibly among other things, credit or debit card information, authorization to place a charge on a MS's phone bill, etc.

The specific pieces of information that were described above are illustrative only and it will be readily apparent to one of ordinary skill in the relevant art that numerous other pieces of information are easily possible and indeed are fully within the scope of the present invention.

As noted above the information that Mary provided during the registration process may be preserved in a data repository (e.g., a database) and may optionally be organized as a MS Profile.

The content of Mary's profile may optionally be augmented by SP$_x$. For example, one or more internal or external sources of consumer, demographic, psychographic, etc. information may be leveraged to selectively enhance or augment elements of Mary's profile.

As noted above, a SP's BI may optionally complete a billing transaction. The billing transaction may take any number of forms and may involve different external entities (e.g., a WC's billing system, a carrier billing system service bureau, a credit or debit card clearinghouse, etc.). The billing transaction may include, inter alia:

1) The appearance of a line item charge on the bill or statement that a MS receives from her WC. Exemplary mechanics and logistics associated with this approach are described in pending U.S. patent application Ser. No. 10/837,695 entitled "SYSTEM AND METHOD FOR BILLING AUGMENTATION," which is incorporated herein by reference. Other ways of completing or performing line item billing are easily implemented by those skilled in the art.

2) The charging of a credit card or the debiting of a debit card.

In FIG. 3 the exchanges that are collected under the designation Set 2 represent the activities that might take place as SP$_x$ 304 optionally registers, coordinates, etc. with one or more external entities to, possibly among other things, secure access, arrange to receive updates, etc. (336→338).

The specific exchanges that were described above (as residing under the designation Set 2) are illustrative only and it will be readily apparent to one of ordinary skill in the relevant art that numerous other exchanges (including, inter alia, an external entity optionally explicitly confirming with a MS their desire/acceptance before beginning to provide access; updates to various of the information in a MS Profile in a SP's repository; a SP dispatching one or more test messages to an external entity; etc.) are easily possible and indeed are fully within the scope of the present invention.

In FIG. 3 the exchanges that are collected under the designation Set 3 represent the activities that might take place as SP$_x$ 304 dispatches to Mary 302 one or more confirmation E-Mail messages (340→342).

The specific exchanges that were described above (as residing under the designation Set 3) are illustrative only and it will be readily apparent to one of ordinary skill in the relevant art that numerous other exchanges (including, inter alia, other types or forms of confirmation messages) are easily possible and indeed are fully within the scope of the present invention.

In FIG. 3 the exchanges that are collected under the designation Set 4 represent the activities that might take place as an AS 318 of SP$_x$ 304 dispatches one or more confirmation SMS, MMS, IMS, etc. messages to Mary's 302 WD 306 (344→348) and Mary 302 replies or responds to the message(s) (350→354). In the instant example:

1) The messages are shown traversing a MICV 312.

2) The SP 304 may employ, possibly inter alia, a SC or a regular TN as its source address (and to which it would ask users of its service to direct any reply messages). While the abbreviated length of a SC (e.g., five digits for a SC administered by Neustar under the Common Short Code [CSC] program) incrementally enhances the experience of a MS 302 (e.g., the MS need remember and enter only a few digits as the destination address of a message) it also, by definition, constrains the universe of available SCs thereby causing each individual SC to be a limited or scarce resource and raising a number of SC/CSC management, etc. issues. A description of a common (i.e., universal) short code environment may be found in pending U.S. patent application Ser. No. 10/742,764 entitled "UNIVERSAL SHORT CODE ADMINISTRATION FACILITY."

The specific exchanges that were described above (as residing under the designation Set 4) are illustrative only and it will be readily apparent to one of ordinary skill in the relevant art that numerous other exchanges are easily possible and indeed are fully within the scope of the present invention.

The Set 1, Set 2, Set 3, and Set 4 exchanges that were described above are illustrative only and it will be readily apparent to one of ordinary skill in the relevant art that numerous other exchanges are easily possible and indeed are fully within the scope of the present invention.

Figure 4:
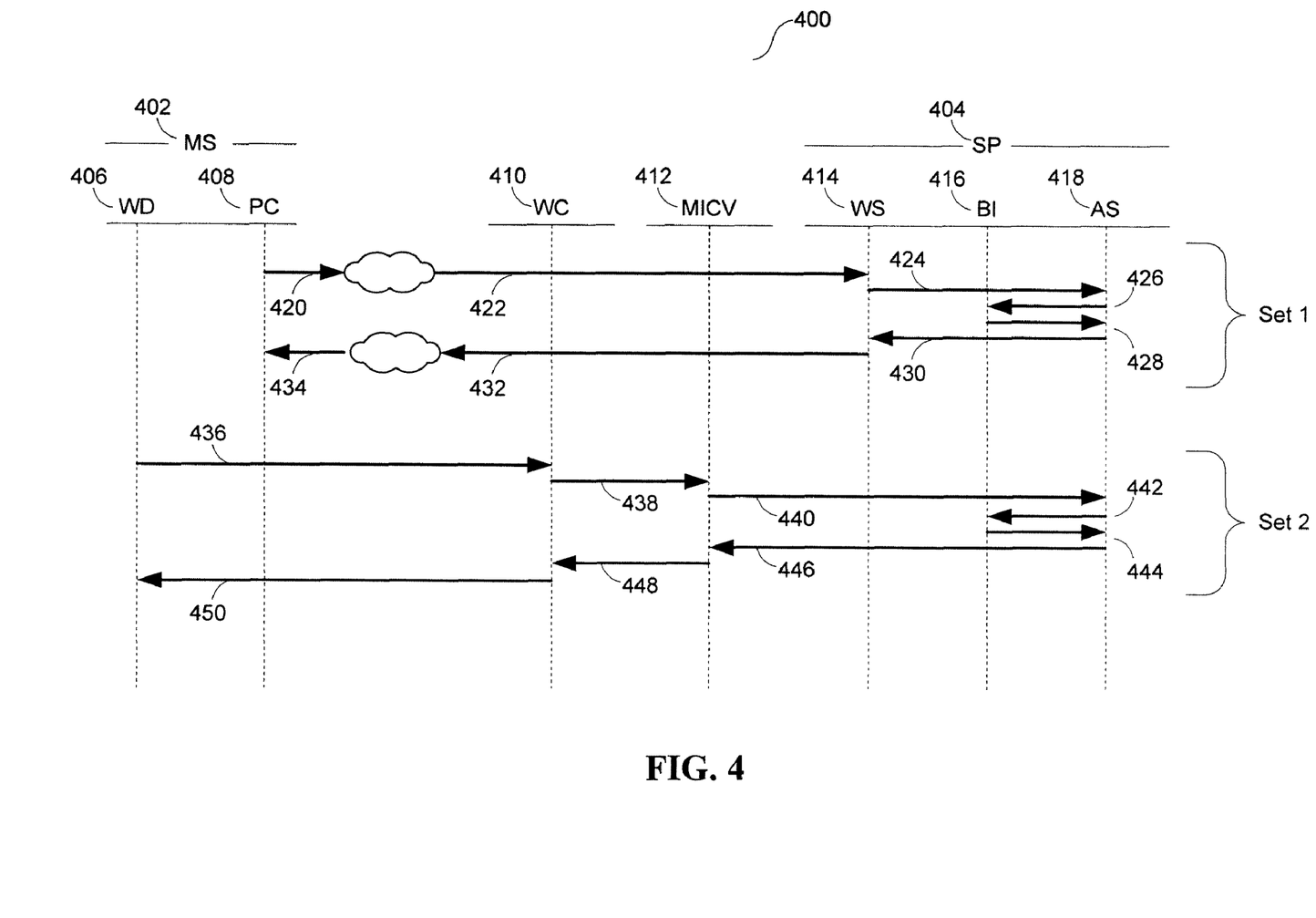
FIG. 4 illustrates further of the exchanges or interactions that are supported by aspects of the present invention.

The information that was described above may be subsequently managed (e.g., existing information may be edited or removed, new information may be added, etc.) through any combination of one or more channels including, inter alia, a SP's WWW facility, wireless messaging (SMS, MMS, IMS, etc.), E-Mail messages, IM exchanges, conventional mail, telephone, IVR facilities, etc. Such management is illustrated generally through FIG. 4 and reference numeral 400 (which employs the same set of entities as FIG. 3 and reference numeral 300). For example, a MS 402 might seamlessly manage various of the information using, possibly inter alia, any combination of a WWW-based facility via a PC 408 (i.e., through 420→434) and a messaging-based facility via their WD 406 (i.e., through 436→450) with, optionally, the ability to switch between facilities at will at any time without the loss of any state, context, etc.

To continue with our hypothetical example . . . . After completing an optional registration process Mary may begin to dispatch messages from her WD that are addressed to DynaTags.

As noted previously, a DynaTag:

1) Is a variable length sequence of various numeric, alphabetic, special, etc. characters. Exemplary DynaTags might include 'Work,' 'Home,' 'Mom,' 'Dad,' 'Search,' 'A1,' etc.

2) Is associated with (i.e., maps to) a specific destination address. A destination address might be, possibly inter alia, a TN, a SC, an E-Mail address, an IM handle or address, a SIP address, etc. For example, a MS might associate or map their DynaTag 'Mom' to the TN 13015551212 and they might associate their DynaTag 'Search' to the SC 46645 (i.e., Google's SC-based search facility).

3) Exists within a MS' private namespace (e.g., a DynaTag book). For example, numerous MSs might create the DynaTag 'Home' but each MS would direct their DynaTag 'Home' to a different destination address (e.g., possibly their specific home TN). For example, $MS_a$ might create the DynaTag 'TS' that resolves to 17035554321. If $MS_b$ were to dispatch a message to DynaTag 'TS' (and provided that $MS_b$ had not defined their own DynaTag 'TS') the message would not be routable (as the DynaTag 'TS' does not exist within $MS_b$'s namespace) and, possibly among other things, $MS_b$ might receive back an error message (indicating something like "Sorry, we are unable to route your message.").

Within $SP_x$ an illustrative DynaTag book for Mary (as a MS whose WD has the TN 17035551212) might contain:

| MS TN | DynaTag | DestinationAddress | RouteSet | ... |
|---|---|---|---|---|
| 17035551212 | TS | 17035559876 | XYZ00003 | ... |
| | Sam | sam.smith@abc.com | INT00001 | ... |
| | Mom | 13015551212 | DEF00021 | ... |
| | Search | 46645 | XYZ00291 | ... |
| | Home | 17035552345 | ABC00132 | ... |
| | Work | 12025558765 | ABC00081 | ... | where:

a) The MS TN column might contain, possibly inter alia, the TN of a MS' WD. For example, the TN of Mary's WD is 17035551212.

b) The DynaTag column might contain, possibly inter alia, a DynaTag. For example, 'Work,' 'Home,' 'Mom,' 'Dad,' 'Search,' etc.

c) The DestinationAddress column might contain, possibly inter alia, a destination address (such as, possibly inter alia, a TN, a SC, an E-Mail address, an IM handle or address, a SIP address, etc.). For example, a TN such as 13015551212, a SC such as 46645, etc.

d) The RouteSet column might contain, possibly inter alia, the identity of a specific destination delivery channel (e.g., 'XYZ0003' might indicate delivery channel 3 for carrier XYZ) that was developed during a destination address routing operation. For example, for reasons of efficiency and performance it may be desirable to preserve elements of a destination address routing operation to obviate the need for future such operations for a specific destination address.

The DynaTag book that was described above is illustrative only and it will be readily apparent to one of ordinary skill in the relevant art that numerous other columns (e.g., one or more date and/or time values [when created, when last updated, when last referenced or used, etc.]) and/or column arrangements, alternate (e.g., non-column-based) structures, etc. are easily possible and indeed are fully within the scope of the present invention.

4) May be managed (e.g., create, edit, delete, organized, etc.) by a MS. As noted previously, FIG. 4 and reference numeral 400 provide a general illustration of such management. For example, a MS 402 might seamlessly manage various of the information using, possibly inter alia, any combination of a WWW-based facility via PC 408 (i.e., through 420→434) and a messaging-based facility via their WD 406 (i.e., through 436→450) with, optionally, the ability to switch between facilities at will at any time without the loss of any state, context, etc.

Figure 5:
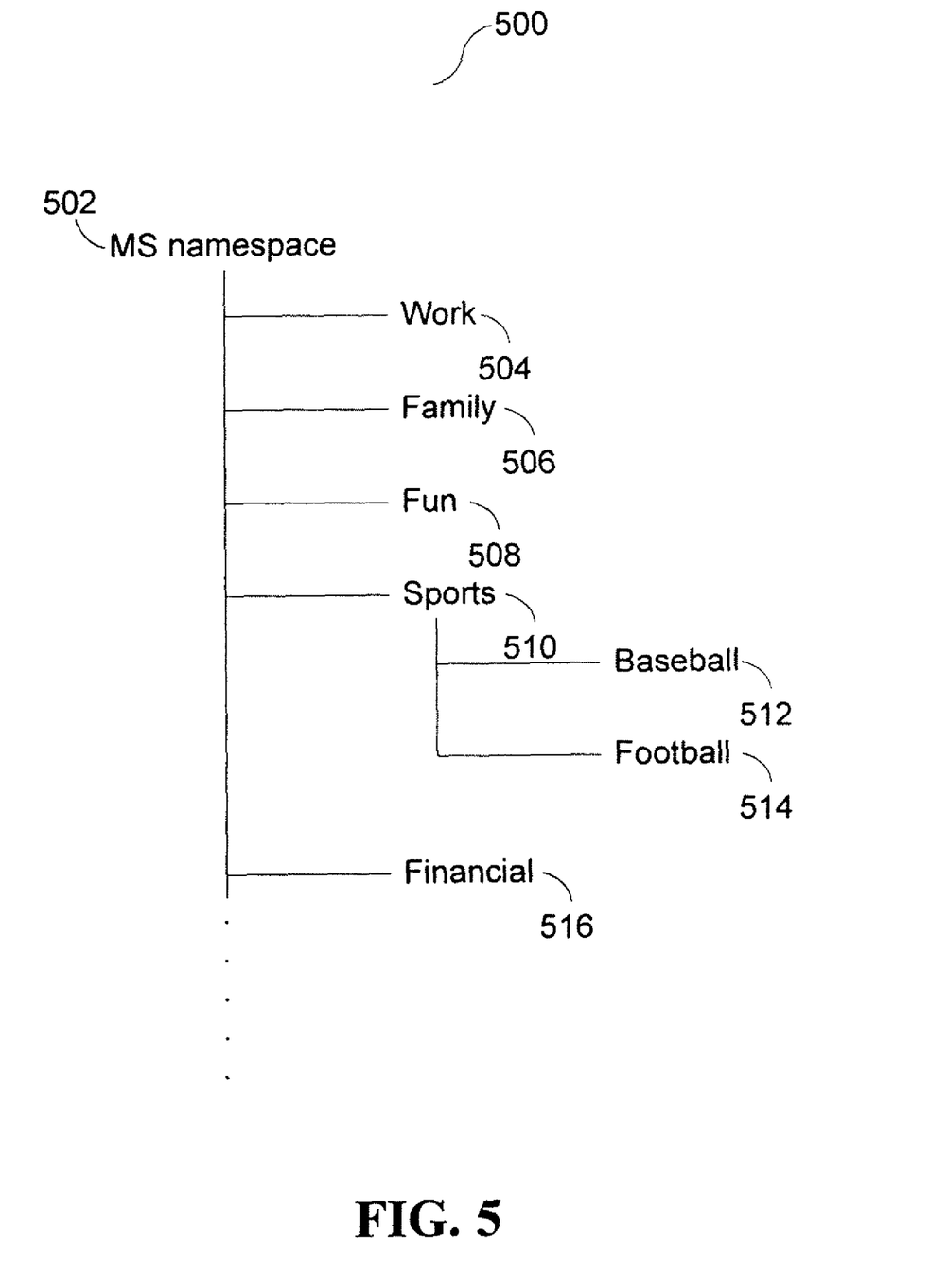
FIG. 5 illustrates a hypothetical MS' hierarchical organization of various of their DynaTags.

A MS may optionally organize their DynaTags using different structures or paradigms. For example, FIG. 5 and reference numeral 500 illustrate a hypothetical hierarchical structure.

5) May be used by a MS as the destination address of a message.

It is important to note that:

1) Since a DynaTag exists within a MS' private namespace (e.g., a DynaTag book) and is managed (e.g., create, edit, delete, organized, etc.) by a MS, a DynaTag is fundamentally different than, and significantly more flexible than, a SC.

2) A DynaTag may optionally refer or point to multiple (heterogeneous or homogeneous) destination addresses.

3) The length, format or structure, content, etc. of a DynaTag may optionally be constrained based on, possibly inter alia, specific (handset, network, operating, etc.) requirements based on any combination of WD, WC, MICV, etc.

4) A SP may optionally provide (through, possibly inter alia, one or more SMS, MMS, etc. messages) to a MS a copy of the MS' DynaBook and optionally allow the MS to pick or select a specific DynaTag from the returned DynaBook.

5) A SP may optionally provide (through, possibly inter alia, one or more SMS, MMS, etc. messages) to a MS a list of destination addresses (e.g., from recently-exchanged messages), allow the MS to pick or select a specific address from the returned list, and allow the MS to create a DynaTag for the selected address.

6) After a MS dispatches a message to a destination address (e.g., to a TN) a SP may optionally provide (through, possibly inter alia, one or more SMS, MMS, etc. messages) the MS with an opportunity to create a DynaTag for the address.

7) A SP may optionally include any number of audit trail mechanisms to track, possibly inter alia, the particulars (e.g., id of user, date and time, etc.) of the management (e.g., creation, editing, deletion, organization, etc.), use, etc. of a DynaTag.

8) When a MS creates a new DynaTag or changes the destination address of an existing DynaTag a SP may optionally alert the MS to any potential conflicts, etc. For example, if a MS were to create the DynaTag '46645' (while perfectly acceptable, that specific sequence of digits already exists as Google's SC-based search facility) a SP may alert the MS to the potential conflict, suggest alternatives, etc.

Figure 6:
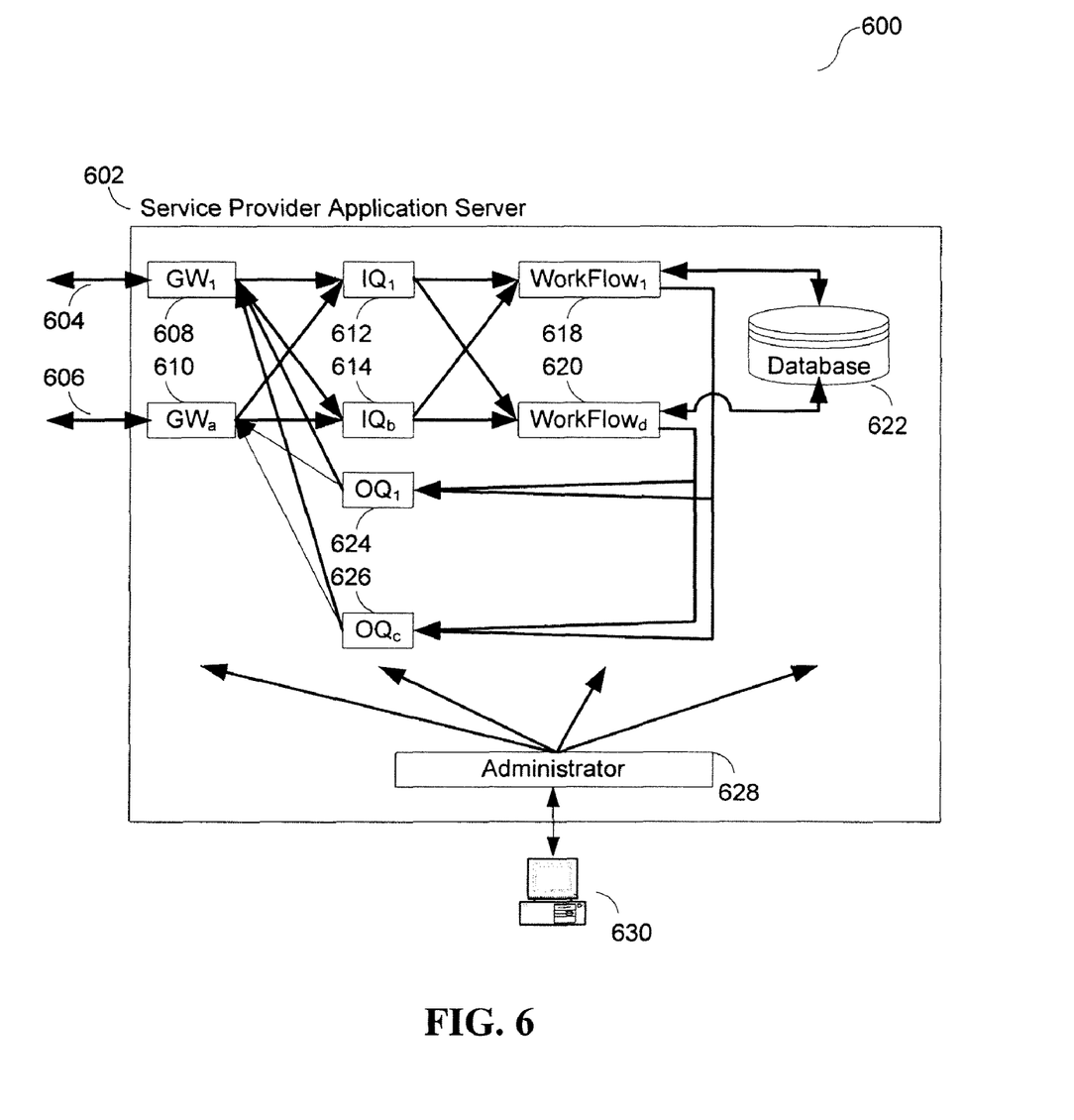
FIG. 6 is a diagrammatic presentation of aspects of an exemplary SP Application Server (AS).

FIG. 6 and reference numeral 600 provide a diagrammatic presentation of aspects of an exemplary SP AS 602. The illustrated AS 6402 contains several key components—Gateways (GW$_1$ 608→GW$_a$ 610 in the diagram), Incoming Queues (IQ$_1$ 612→IQ$_b$ 614 in the diagram), WorkFlows (WorkFlow$_1$ 618→WorkFlow$_d$ 620 in the diagram), Database 622, Outgoing Queues (OQ$_1$ 624→OQ$_c$ 626 in the diagram), and an Administrator 628. It will be readily apparent to one of ordinary skill in the relevant art that numerous other components are possible within an AS 602.

A dynamically updateable set of one or more Gateways (GW$_1$ 608→GW$_a$ 610 in the diagram) handle incoming (e.g., SMS/MMS/IMS/etc. messaging, etc.) traffic and outgoing (e.g., SMS/MMS/IMS/etc. messaging, etc.) traffic. Incoming traffic is accepted and deposited on an intermediate or temporary Incoming Queue (IQ$_1$ 612→IQ$_b$ 614 in the diagram) for subsequent processing. Processed artifacts are removed from an intermediate or temporary Outgoing Queue (OQ$_1$ 624→OQ$_c$ 626 in the diagram) and then dispatched.

A dynamically updateable set of one or more Incoming Queues (IQ$_1$ 612→IQ$_b$ 614 in the diagram) and a dynamically updateable set of one or more Outgoing Queues (OQ$_1$ 624→OQ$_c$ 626 in the diagram) operate as intermediate or temporary buffers for incoming and outgoing traffic.

A dynamically updateable set of one or more WorkFlows (WorkFlow$_1$ 618→WorkFlow$_d$ 620 in the diagram) remove incoming traffic from an intermediate or temporary Incoming Queue (IQ$_1$ 612→IQ$_b$ 614 in the diagram), perform all of the required processing operations (more about this below), and deposit processed artifacts on an intermediate or temporary Outgoing Queue (OQ$_1$ 624→OQ$_c$ 626 in the diagram).

The Database 622 that is depicted in FIG. 6 is a logical representation of the possibly multiple physical repositories that may be implemented to support, inter alia, configuration, profile, monitoring, alerting, etc. information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

As depicted in FIG. 6 an Administrator 628 provides management or administrative control over all of the different components of an AS 602 through, as one example, a WWW-based interface 630. It will be readily apparent to one of ordinary skill in the relevant art that numerous other interfaces (e.g., a data feed, an Application Programming Interface [API], etc.) are easily possible.

Through flexible, extensible, and dynamically updatable configuration information a WorkFlow component may be quickly and easily realized to support any number of activities. For example, WorkFlows might be configured to support the registration of a MS; the extraction of data values from an incoming message; the editing/validation of data values; the enhancement/augmentation of data values; the resolution of a DynaTag to a destination address; the generation and dispatch of reply messages; the generation of scheduled and/or on-demand reports; the interaction with a blog; the interaction with external and/or internal sources of data or information; etc. The specific WorkFlows that were just described are exemplary only; it will be readily apparent to one of ordinary skill in the relevant art that numerous other WorkFlow arrangements, alternatives, etc. are easily possible.

As noted above, a SP may implement a WorkFlow that, possibly among other things, resolves a DynaTag to a destination address. For example, using the illustrative DynaTag book that was presented above:

| MS TN | DynaTag | DestinationAddress | RouteSet | ... |
|---|---|---|---|---|
| 17035551212 | TS | 17035559876 | XYZ00003 | ... |
| | Sam | sam.smith@abc.com | INT00001 | ... |
| | Mom | 13015551212 | DEF00021 | ... |
| | Search | 46645 | XYZ00291 | ... |
| | Home | 17035552345 | ABC00132 | ... |
| | Work | 12025558765 | ABC00081 | ... |
| . | | | | |
| . | | | | |
| . | | | | | if such a WorkFlow were given the DynaTag 'Home' for MS 17035551212 the WorkFlow would resolve the DynaTag to the destination address (TN) 17035552345 and retrieve the RouteSet ABC00081. Similarly, if the WorkFlow were given the DynaTag 'Search' for the same MS the WorkFlow would resolve the DynaTag to the destination address (SC) 46645 and retrieve the RouteSet XYZ00291.

A SP may maintain a repository (e.g., a database) into which selected details of all administrative, messaging, etc. activities may be recorded. Among other things, such a repository may be used to support:

1) Scheduled (e.g., daily, weekly, etc.) and/or on-demand reporting with report results delivered through SMS, MMS, IMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, IMS, etc. messages; through E-Mail; through a WWW-based facility; etc.

A SP may offer any number of optional features, capabilities, etc. including, possibly inter alia:

1) Generate scheduled (e.g., daily, weekly, etc.) and/or on-demand activity/usage, status, result, etc. reports with generated reports delivered through SMS, MMS, IMS, etc. messages; through E-Mail; through IM; through a WWW-based facility; etc.

2) Perform one or more incremental billing operations as it completes, for example, the various processing activities that were described above. An incremental billing operation may be triggered by configurable thresholds such as, possibly inter alia, total inbound and/or outbound message count, individual or aggregate inbound and/or outbound message volume, a DynaTag-specific fee or charge, value-add services provided, etc. As noted previously, a billing operation may take any number of forms and may involve different external entities (e.g., a WC's billing system, a carrier billing system service bureau, a credit or debit card clearinghouse, etc.). SP$_x$ may optionally preserve some or all of any such billing activities within, for example, one of its database, etc. environments.

3) Allow advertisers to register and/or provide (e.g., directly, or through links/references to external sources) advertising content.

The (confirmation, reply, etc.) message(s) and reports that were described above may optionally contain an informational element—e.g., a public service announcement, a relevant or applicable factoid, etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a Global Positioning System (GPS)/Location-Based Services (LBS) facility).

The message(s) and reports that were described above may optionally contain advertising—e.g., textual material if an SMS model is being utilized, multimedia (images of brand logos, sound, video snippets, etc.) material if an MMS model is being utilized, etc. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a GPS/LBS facility).

The message(s) and reports that were described above may optionally contain promotional materials (e.g., text, still images, video clips, etc.).

The discussion that was just presented referenced two specific wireless messaging paradigms—SMS and MMS. These paradigms potentially offer an incremental advantage over other paradigms; for example, native support for SMS and MMS is commonly found on a WD that a potential MS would be carrying. However, it is to be understood that it would be readily apparent to one of ordinary skill in the relevant art that numerous other paradigms (such as, possibly inter alia, IMS, etc.) are fully within the scope of the present invention.

The foregoing disclosure of the preferred embodiments of the present invention has been presented for purposes of illustration and description. It is not intended to be exhaustive or to limit the invention to the precise forms disclosed. It will be readily apparent to one of ordinary skill in the relevant art that numerous alternatives to the presented embodiments are easily possible and, indeed, are fully within the scope of the present invention.

The following list defines acronyms as used in this disclosure.

| Acronym | Meaning |
| --- | --- |
| A2P | Application-to-Peer |
| API | Application Programming Interface |
| AS | Application Server |
| BI | Billing Interface |
| CP | Content Provider |
| CSC | Common Short Code |
| DBMS | Database Management System |
| DynaTag | Dynamic Tag |
| E-Mail | Electronic Mail |
| GIS | Geographic Information System |
| GPS | Global Positioning System |
| GW | Gateway |
| IM | Instant Messaging |
| IMS | IP Multimedia Subsystem |
| IP | Internet Protocol |
| IQ | Incoming Queue |
| IVR | Interactive Voice Response |
| LBS | Location-Based Service |
| MICV | Messaging Inter-Carrier Vendor |
| MMS | Multimedia Message Service |
| MS | Mobile Subscriber |
| ODBMS | Object Database Management System |

-continued

| Acronym | Meaning |
| --- | --- |
| OQ | Outgoing Queue |
| P2P | Peer-to-Peer |
| PC | Personal Computer |
| RDBMS | Relational Database Management System |
| SC | Short Code |
| SIP | Session Initiation Protocol |
| SMS | Short Message Service |
| SP | Service Provider |
| TN | Telephone Number |
| WC | Wireless Carrier |
| WD | Wireless Device |
| WF | WorkFlow |
| WS | WWW Server |
| WWW | World Wide Web |

What is claimed is:

1. A method for routing a message within a wireless messaging ecosystem, the method comprising:
   receiving, from an originating mobile subscriber, an indication regarding a relationship between a Dynamic Tag (DynaTag) and a destination address;
   storing, at a service provider remote from the originating mobile subscriber, the DynaTag and destination address along with an indication of a designated delivery channel via which the destination address can be reached;
   receiving at a gateway an incoming message, the incoming message containing the DynaTag and having been originally initiated as a wireless message from the originating mobile subscriber; and
   performing one or more processing steps on the incoming message including at least querying a namespace private to the originating mobile subscriber to resolve the DynaTag to the destination address and to identify the designated delivery channel via which to send the incoming message.

2. The method of claim 1, wherein the incoming message is one of (a) a Short Message Service message, (b) a Multimedia Message Service message, or (c) an IP Multimedia Subsystem message.

3. The method of claim 1, wherein the structure and content of the namespace private to the originating mobile subscriber are under management of at least the originating mobile subscriber.

4. The method of claim 3, wherein the management is through any combination of a Web-based facility and/or a message-based facility.

5. The method of claim 3, wherein the structure of the namespace private to the originating mobile subscriber is hierarchical.

6. The method of claim 1, wherein the destination addresses is one of (a) a telephone number, (b) a short code, (c) an e-mail address, (d) an instant messaging handle or address, or (e) a Session Initiation Protocol address.

7. The method of claim 1, wherein the processing steps include a billing transaction.

8. The method of claim 1, wherein the processing steps employ information previously supplied by the originating mobile subscriber.

9. The method of claim 8, wherein the information is defined by the originating mobile subscriber during a registration process.

10. The method of claim 9, wherein the information includes at least one of (a) identifying information, (b) DynaTag information, and (c) billing information.

11. The method of claim 9, wherein the information is preserved through a User Profile.

12. The method of claim 9, wherein the registration process is Web-based.

13. The method of claim 9, wherein the registration process includes a billing component.

14. A system for routing a message within a wireless messaging ecosystem, the system comprising:
   a gateway at which an incoming message is received, the incoming message having been initiated as a wireless message, from an originating mobile subscriber, that contains at least a Dynamic Tag (DynaTag); and
   at least one workflow module, remote from the originating mobile subscriber, the at least one workflow module configured to query a namespace private to the originating mobile subscriber to resolve the DynaTag to a destination addresses, the destination address having been previously associated to the DynaTag by the originating mobile subscriber,
   wherein the workflow module is further configured to obtain, via information stored along with information sufficient to resolve the DynaTag to the destination address, an indication of a delivery channel via which to send the incoming message.

15. The system of claim 14, wherein the incoming message is one of (a) a Short Message Service message, (b) a Multimedia Message Service message, or (c) an IP Multimedia Subsystem message.

16. The system of claim 14, wherein the structure and content of the namespace private to the originating mobile subscriber are under management of at least the originating mobile subscriber.

17. The system of claim 16, wherein the management is through any combination of a Web-based facility and/or a message-based facility.

18. The system of claim 16, wherein the structure of the namespace private to the originating mobile subscriber is hierarchical.

19. The system of claim 14, wherein the destination addresses is one of (a) a telephone number, (b) a short code, (c) an e-mail address, (d) an instant messaging handle or address, or (e) a Session Initiation Protocol address.

20. The system of claim 14, wherein the at least one workflow module completes a billing transaction.

21. The system of claim 14, wherein the at least one workflow module employs information previously supplied by the originating mobile subscriber.

22. The system of claim 21, wherein the information is defined by the originating mobile subscriber during a registration process.

23. The system of claim 22, wherein the information includes at least one of (a) identifying information, (b) DynaTag information, and (c) billing information.

24. The system of claim 22, wherein the information is preserved through a User Profile.

25. The system of claim 22, wherein the registration process is Web-based.

26. The system of claim 22, wherein the registration process includes a billing component.

\* \* \* \* \*